G. A. FORD.
PULLEY-BLOCK.
No. 7,671. Reissued May 8, 1877.
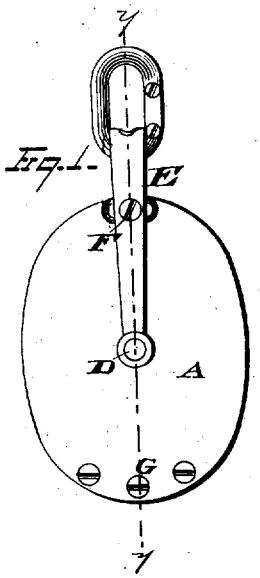
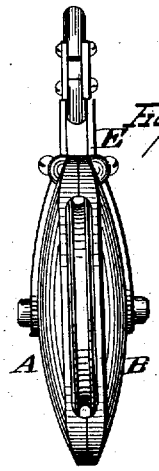
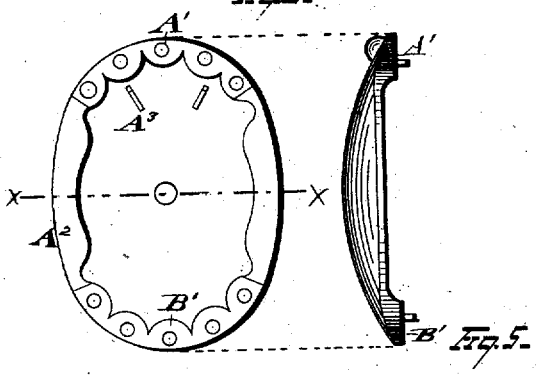
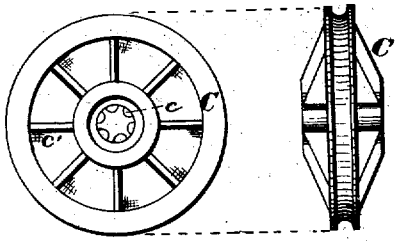
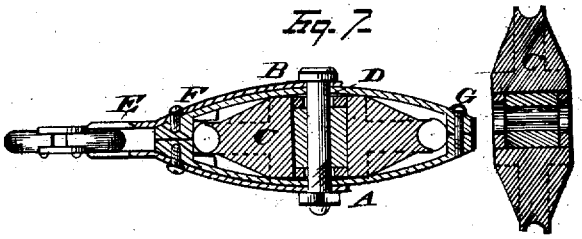
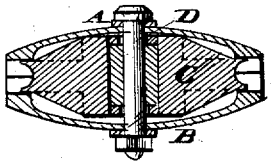
WITNESSES
Ed. S. Nottingham.
A. M. Bright.
INVENTOR
Geo. A. Ford.
By L. Eggerts & Sons
ATTORNEYS.
N. PETERS, PHOTO-LITHOGRAPHER, WASHINGTON, D. C.

UNITED STATES PATENT OFFICE.

GEORGE A. FORD, OF CLEVELAND, OHIO.

IMPROVEMENT IN PULLEY-BLOCKS.

Specification forming part of Letters Patent No. 142,095, dated August 26, 1873; reissue No. 5,784, dated March 10, 1874; reissue No. 7,671, dated May 8, 1877; application filed April 11, 1877.

*To all whom it may concern:*

Be it known that I, GEORGE A. FORD, of Cleveland, county of Cuyahoga and State of Ohio, have invented certain new and useful Improvements in Pulley-Blocks; and I hereby declare the following to be a full, clear, and complete description thereof, reference being had to the accompanying drawings, which form a part of this specification.

In the drawing, Figure 1 is a side view of a pulley-block; Fig. 2, an end view. Fig. 3 represents an inside and edge view of one of the shells. Fig. 4 represents a side and edge view of the sheave. Fig. 5 is a cross-section of the sheave by a plane passed through the shaft. Fig. 6 is a cross-section along the line *x x*. Fig. 7 is a cross-section along the line *z z*.

This invention relates, first, to a pulley-block having a sheave with a wide head, so that it may have a broad bearing upon the spindle. Second, to the construction of the cheeks or shell of the block to concavo-convex in form, whereby they are rendered stronger and lighter in proportion to the width of material than the cheeks of ordinary pulley-blocks. Third, to the formation of the cheek with a lip or swell adjacent to the periphery of the sheave, for adding strength to the cheek, and to form a lateral support for the sheave. Fourth, in providing the metallic cheeks with ribs or inside projections, for adding strength and stiffness to them. Fifth, in forming the cheek-pieces with projections which extend from each cheek-piece toward the other cheek-piece, and form a partition or division between the shells. Sixth, in forming the concavo-convex shells and the sheave relatively to each other, so that the hub of the sheave shall embrace, substantially, the whole length of the spindle between the cheeks.

A and B are the shells. They are made concavo-convex in form, so that when put together the block has a double convex shape. The concavo-convex shell gives greater strength to the block than the cheeks or shell of the ordinary pulley-blocks. This is also of great importance in making small pulleys, as they can be made very light and sufficiently strong for all practical purposes.

$A^1$ and $B'$ are projections from the cheeks A and B. They are made in the same piece with the cheeks. They serve, by coming together, to form the division wall or partition which separates the cheeks from each other. $A^2$ are ribs or projections cast upon the inside of the shell. There are like projections upon the other shell. They serve to strengthen and stiffen the shells, without materially adding to their weight. $A^3$ are lips or swells, which project from the inside of each shell, their object being to increase the strength of the shell, and at the same time closely embrace the periphery of the sheave, thus giving it lateral support, and causing it to rest squarely upon the spindle.

C is the sheave. Its hub is made to project laterally, so as to embrace, substantially, the whole length of the spindle between the cheeks. D is the spindle. E is the supporting-strap. F is a bolt, which is passed through the strap and into cheek-pieces A and B, serving to firmly support the strap at the proper edge of the block, and to hold the cheeks firmly together at this point. G are fastenings for securing the cheeks together at their lower ends. In the sheave shown in the drawings the hub is lined with anti-friction rollers *c*, and webs or ribs *c'* are cast upon the surfaces of the wheel in the end of the spokes to support the strain that may be thrown upon the projecting portions of the hub. In giving to the sheave a long hub it has more bearing-surface on the spindle, and is consequently less liable to become cramped by a sidewise strain.

What I claim is—

1. In a pulley-block, the concavo-convex cheeks A B, of metal, substantially as and for the purpose described.

2. In a pulley-block, the concavo-convex cheeks A B, with projections $A^1$ $B'$ thereon, substantially as and for the purposes described.

3. In a pulley-block, the metallic cheeks A B, having ribs $A^2$ upon the inside of same, substantially as and for the purposes described.

4. The cheek-pieces A B, formed with lips or swells $A^3$, substantially and for the purpose set forth.

5. In a pulley-block, the sheave, provided with the long hub and the webs or spokes $e'$, substantially as and for the purpose described.

6. The combination in a pulley-block of concavo-convex metallic cheeks and a sheave, the cheeks and sheave constructed relatively to each other, so that the hub of the sheave shall embrace, substantially, the whole length of the spindle between the cheeks, substantially as and for the purposes described.

7. The pulley-block, composed of concavo-convex cheeks A B, with projections $A^1$ $B'$, a sheave, and supporting-strap with screws or bolts F, substantially as and for the purposes described.

GEORGE A. FORD.

Witnesses:
F. TOUMEY,
W. E. DONNELLY.